March 28, 1939.  R. R. RIDGWAY  2,152,153
THERMOCOUPLE
Filed Nov. 22, 1935

ELECTROMOTIVE FORCE vs. TEMPERATURE DIFFERENCE

Inventor
RAYMOND R. RIDGWAY
By George Crompton Jr.
Attorney

WITNESS
Franklin E. Johnson

Patented Mar. 28, 1939

2,152,153

UNITED STATES PATENT OFFICE 2,152,153

THERMOCOUPLE

Raymond R. Ridgway, Niagara Falls, N. Y., assignor to Norton Company, Worcester, Mass., a corporation of Massachusetts Application November 22, 1935, Serial No. 51,142

6 Claims. (Cl. 136—5)

The invention relates to thermocouples, and with regard to its more specific features, to high temperature thermocouples.

One object of the invention is to provide a practical and efficient thermocouple. Another object of the invention is to provide a thermocouple adapted to measure accurately at high temperatures. Another object of the invention is to provide a durable thermocouple. Another object of the invention is to provide a thermocouple generating an electromotive force considerably in excess of that generated by previous thermocouples at the same temperature differential. Another object of the invention is to provide a thermocouple of relatively high electrical and low thermal conductivity. Another object of the invention is to provide a practical nonmetallic thermocouple and one constructed of highly refractory materials. Another object of the invention is to provide a thermocouple constructed of stable materials.

Other objects of the invention are to provide a thermocouple that shall be reliable over a long period of continued use, that can be associated with simple electrical recording apparatus to secure accurate indications, that shall reach higher temperatures than previously considered practical. Another object of the invention is to provide a thermocouple that at high temperatures shall generate of the order of 30 times the voltage of generally used prior thermocouples. Another object of the invention is to provide a thermocouple that shall measure temperatures up to 2400° C.

Other objects of the invention are to provide a thermocouple the elements of which have constant electrical resistance at a given temperature after continued use; a thermocouple the elements of which have low temperature coefficient of resistance; a thermocouple which may be efficiently used in situations where no thermocouple is now used in practice. Another object of the invention is to provide a thermocouple applicable especially for use in open hearth furnaces, continuous and periodic kilns, retorts, electric furnaces, and other high temperature apparatus. Another object of the invention is to provide a thermocouple useful over a wide range of temperatures, efficient between 200° C. and 2400° C. Another object of the invention is to provide a thermocouple reliable under reducing conditions and when metallic vapors are present. Another object of the invention is to provide a thermocouple which may be used without a separate refractory protecting tube. Other objects will be in part obvious or in part pointed out hereinafter.

The invention accordingly consists in the features of construction, combinations of elements, and arrangements of parts, all as will be illustratively described herein and the scope of the application of which will be indicated in the following claims.

In the accompanying drawing, in which is shown one of many possible embodiments of the mechanical features of this invention, Figure 1 is an axial sectional view of the thermocouple and associated apparatus together with an electrical diagram illustrating one of many possible circuits for recording the electromotive force, which may be indicated on a scale calibrated in terms of temperature;

Figure 1:
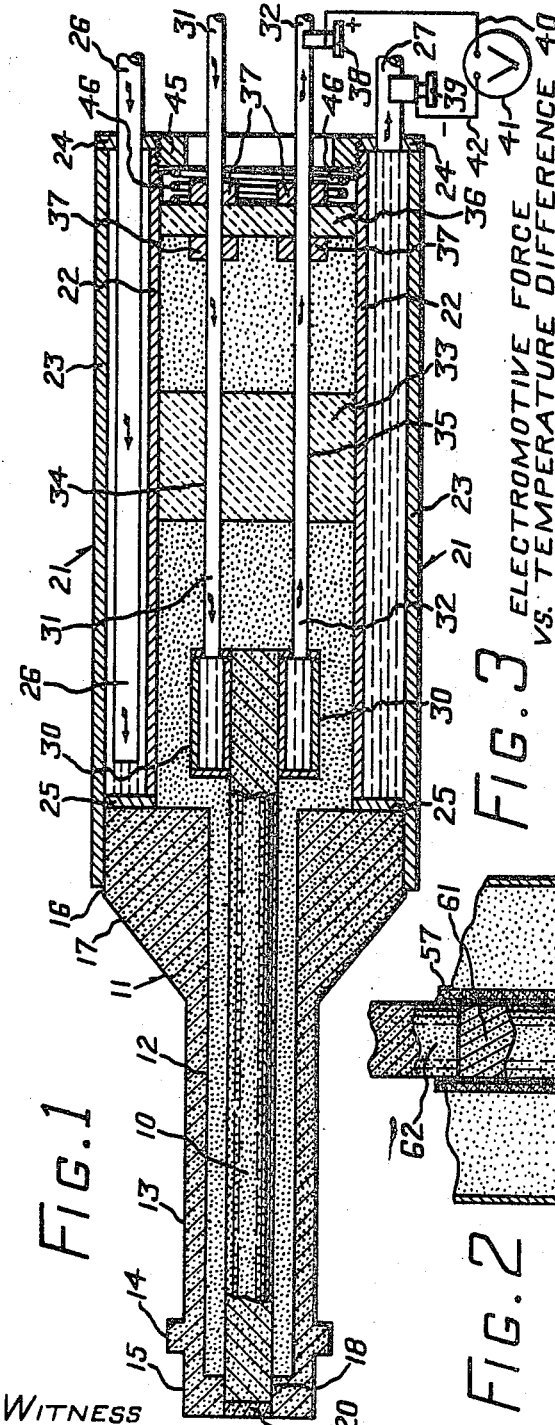

Referring now to Figure 1, I provide a rod 10 of boron carbide ($B_4C$). Boron carbide is a material which may be made according to my prior United States Patent No. 1,897,214. In any suitable manner grains of boron carbide may be sintered together to form a rod such as the rod 10; for example the grains may be molded under heat and pressure in apparatus such as disclosed in my aforesaid copending application. Boron carbide is a material of highly refractory quality, for example it will withstand a temperature in excess of 2400° C. without changing its characteristics and in fact it fuses at about 2470° C. as determined by optical methods, and may be advantageously used in a thermocouple very close to that temperature. Furthermore, it is not affected by reducing gases, it is a fairly good conductor of electricity, and it is a relatively poor conductor of heat as compared with metallic elements and alloys. Boron carbide, molded into rods under heat and pressure, also possesses adequate strength to withstand any shocks and stresses incident to the use of a thermocouple.

Referring again to the drawing, I provide a hollow member 11 of graphite. This graphite member 11 has a bore 12 of a length slightly less than the length of the rod 10 and of a diameter slightly greater than that of the rod 10, so that on the one hand the rod 10 may project rearwardly of the graphite 11 as shown, and so that on the other hand there may be clearance between the two pieces to avoid short-circuiting. The member 11 includes an elongated generally cylindrical portion 13 of small diameter so that the thermocouple may be introduced into a narrow opening, and for the purpose of locating the thermocouple and holding it in position, I provide an annular ridge 14 integral with the member 11 and spaced from the front end thereof which leaves a, relatively speaking, reduced diameter tip 15 capable of being introduced into a hole or orifice in the part whose temperature is to be measured or into a hole or orifice in some protecting casing, so that the couple contact may be positioned as near to the maximum temperature point as possible.

In order that the thermocouple elements may be attached to the remainder of the apparatus, the graphite member 11 has a greatly enlarged cylindrical portion 16 which merges with the elongated portion 13 as by means of a conical portion 17. The construction described permits location of the high temperature thermocouple contact at or near the material whose temperature is to be measured, at the same time providing rigid and relatively shock-proof elements. In the specific embodiment of the invention so far described the element 10, being the inside element, is made of boron carbide, while the surrounding or outside element 11 is of graphite. Certain advantages inhere from this specific arrangement of the elements, for example boron carbide is relatively expensive as compared to graphite and it is easier to produce it in the form of a straight rod rather than in a shape such as that of the member 11. For many uses an outer member 11 of graphite possesses adequate strength to meet all usual requirements. However, in applications where mechanical shocks may be encountered and where the thermocouple might be dropped upon the floor or otherwise abused, the outer or enclosing member 11 may be made of boron carbide and the inner or rod element 10 may be of graphite. In such event the annular ridge 14 may be a separate piece pressed into place.

The portion 15 of the member 11 has a reduced diameter bore 18 which fits the rod 10 with a press fit. The thermocouple contact is the contact of this bore 18 with the rod 10 and also the contact of the end of a disk 20 of graphite with the front of the rod 10, which disk fits the bore 18. By this construction, a wide contact area is provided which, however, is entirely located within the limits of a small volumetric space.

I provide a water-cooled jacket 21 which may be made of any suitable metal and, for example, in the form of concentric cylindrical shells 22 and 23 closed at one end by means of an annular disk 24 and at the other end by means of an annular disk 25, the shell 23 projecting beyond the shell 22, however, thus providing a seat or socket for the cylindrical portion 16 of the graphite member 11. The disks 24 and 25 may be secured to the shells 22 and 23 in a simple manner, for example by welding or by the use of solder.

I connect the water-cooled pipes 26 and 27 to the water cooling jacket 21 to introduce and exhaust water therefrom, and the supply pipe 26 preferably extends all the way into the water jacket so as to introduce the cold water near the graphite member 11. I further provide a water jacket 30 for the boron carbide rod 10, which is press-fitted thereon and the construction of which is apparent from the drawing and may be similar to the construction of the jacket 21, the jacket 30 being considerably smaller. I provide water pipes 31 and 32 to introduce and exhaust water from the water jacket 30. Situated within the water jacket 21 is a cylindrical refractory block 33, which may be made of any suitable electrical insulating and refractory substances, which is relatively easy to bore, such as the substance generally known under the trade name of Sil-O-Cel. This is a commercial refractory consisting principally of silica ($SiO_2$). I form a pair of parallel bores 34 and 35 in the block 33 in which I locate and support the pipes 31 and 32. The pipes 31 and 32 also pass through and are supported by a fiber disk 36 and may be held in place as by means of collars 37, and the disk 36 fits the bore of the water jacket 21. Each of the pipes 26, 27, 31, and 32 is connected to a rubber hose or the like, not shown, in order to avoid a short circuit and also in order that the apparatus may be readily moved into and out of the desired position. One or both of each set of pipes has an electrode, 38 and 39 respectively, integrally attached thereto, for connection in circuit with the electrical measuring apparatus, which is shown in the drawing by the wiring diagram. As an example of such a measuring apparatus, a conductor 40 connected to the electrode 38 is connected to a volt-meter 41 and a conductor 42 attached to the electrode 39 is connected to the other end of the volt-meter 41, and the volt-meter registers the electromotive force generated and the scale may be calibrated in terms of temperature.

The thermocouple of the invention operates by the differential of temperature between the contact surfaces of the disk 20, bore 18 and rod 10 on the one hand, and both of the water jacket 30 and rod 10 together with the portion 16 and water jacket 21 on the other hand. In order to secure a good contact between the water jacket 30 and the rod 10, I may sweat-solder the former upon the latter. As the device is heated, the contact between the rod 10 and the bore 18 becomes firmer because boron carbide has a higher coefficient of expansion than graphite. For the same reason there is also a tendency for the rod 10 to thrust against the disk 20 as the temperature is raised. In order to avoid too much movement at this contact due to expansion and subsequent contraction in the larger units, I may provide an externally threaded ring 45 fitting the threaded bore of the jacket 21 and holding in place a spring 46 which bears against the disk 36, thus providing a substantially constant pressure at the contact 20.

The temperature at the tip 15 or, more accurately, at the contact junction between boron carbide and graphite in said tip, is what is to be measured. The electromotive force generated is determined by the differential between such temperature and the mean of the temperatures at the junctions of the water jackets with the rod 10 and member 11. Therefore, it is desirable to avoid heat transference between these points, and consequently the property of boron carbide of low thermal conductivity is a desirable feature. In order to avoid heat transference through the air by convection or radiation, and in order to keep the entire apparatus back of the tip 15 as cool as possible, I fill the inside of the apparatus including the bore 12 with lampblack.

It will be observed that lampblack connects the thermocouple elements and the water connects the conductors 40 and 42, but at the voltages generated both of these substances are substantially insulators. The water used should be fresh water, if possible. The temperature at the contact between the graphite member 11 and the outer water jacket 21 and also at the contact between boron carbide rod 10 and the water jacket 30, may be assumed to be 10° C. higher than the cooling water in the exhaust pipes 27 and 32, and on the basis of such assumptions, the instrument is accurate within probably 10° C. at the outside, and it will be recognized that for high temperature readings this is an insignificant figure.

Figure 3:
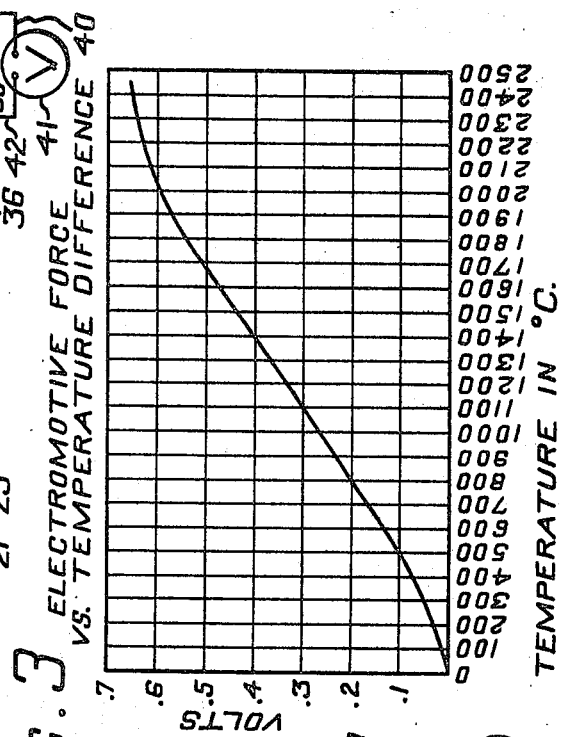
Figure 3 is a temperature-voltage graph of a particular thermocouple made according to the invention.

I have found that the millivoltage generated between rod 10 and the graphite member 11 is directly proportional to the temperature in degrees centigrade between the limits of 400° C. and 2100° C. Referring now to Figure 3, the curve plotted of generated millivoltage vs. temperature difference between the terminals 39 and 38 shows the usual characteristic shape of thermal E. M. F. curves. However, an outstanding feature of this millivoltage temperature relation is the exceedingly high millivoltage generated per unit of temperature difference. As an example, a millivoltage of 270 was shown when the temperature difference between the hot junction of parts 11 and 10 was 1000° C. above the temperature of the cold junctions 16 and 25 and 10 and 30. At 2000° C. temperature difference, the millivoltage indicated was 590 millivolts.

One of the characteristics of boron carbide is that it is located in a remote part of a thermocouple series. Graphite is located in a central portion of such a thermocouple series. In one embodiment of my invention I may use boron carbide for the element 11, as boron carbide may be molded and possesses adequate strength, together with silicon carbide for the rod 10, as silicon carbide may be sintered into rod form. Silicon carbide on a thermocouple series is located in a remote position and on the opposite side from boron carbide. Such a couple develops a voltage of the order of twice that developed by the graphite-boron carbide couple as already described. Nevertheless there are many practical advantages in using graphite together with boron carbide, in that, for example, these substances do not deteriorate with use over a long period of time and the voltage reading is accurate over the entire range.

Figure 2:
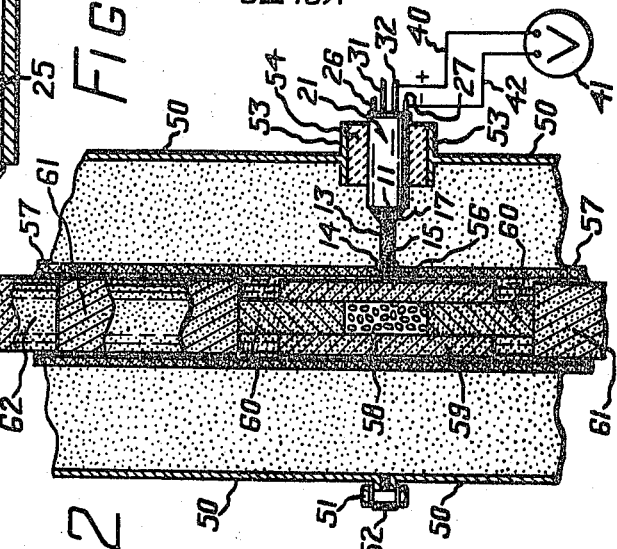
Figure 2 is a fragmentary horizontal axial sectional view through the electric furnace disclosed in my copending application Serial No. 25,244, filed June 6, 1935, illustrating one manner of use of the thermocouple.

Referring now to Figure 2, one application of the couple of the invention is illustrated. I show in Figure 2 an electrical resistance furnace of a type in which boron carbide articles, such as the rod 10 itself, may be made. Such a furnace may comprise a pair of aluminum cylinders 50, 50 connected together by bolts 51 and separated by insulation 52, there being at one point in the circumference of the cylinders 50 some cylindrical flanges 53, 53 which together form a hollow cylinder integral with the cylinders 50, 50 and having an axis perpendicular thereof, the halves 53, 53 being separated by suitable insulation, not shown, and there being a bore reducing plug 54 of Sil-O-Cel supported by the same cylindrical portions 53, 53.

The Sil-O-Cel plug 54 has a bore of a size to receive with a snug fit the jacket 21 of the thermocouple. The tip 15 of the thermocouple is located in a bore 56 of a graphite tube 57 in which the heat is generated. The boron carbide particles 58 being molded are located in a cylindrical graphite mold 59 having mold plugs 60 engaging graphite blocks 61 which are urged together by plungers 62. The boron carbide 58 is molded under great heat and pressure. The furnace is heat insulated by carbon contained in the cylinders 50, 50. The foregoing is simply to show one use of the thermocouple and it will be understood that the invention is in no wise limited thereby.

It will thus be seen that there has been provided by this invention an apparatus in which the various objects hereinbefore set forth together with many thoroughly practical advantages are successfully achieved. As many possible embodiments may be made of the above invention and as many changes may be made in the embodiment above set forth it is to be understood that all matter hereinbefore set forth or shown in the accompanying drawing is to be interpreted as illustrative and not in a limiting sense.

I claim:

1. A thermocouple comprising an element of boron carbide ($B_4C$), an element of graphite, and means holding said elements together in intimate contact.

2. A thermocouple comprising an element of boron carbide ($B_4C$), an element of silicon carbide, and means holding said elements together in intimate contact.

3. A thermocouple comprising a tube, a rod in said tube, said rod and said tube being of materials having different places in the thermocouple series, a water-jacketed cylinder connected to the tube, said water-jacketed cylinder being made of metal and being a conductor for connection to an electric device, a water jacket on the rod, said water jacket being made of metal and being a conductor also for connection to said electric device, a thermocouple juncture between the rod and the tube remote from the cylinder and water jacket aforesaid, and means to convey water to the water-jacketed cylinder and the water jacket on the end of the rod.

4. In apparatus as claimed in claim 3, the combination with the parts and features therein specified of a filling of lamp black inside the cylinder and surrounding the water jacket.

5. In an apparatus as claimed in claim 3, the combination with the parts and features therein specified of comminuted carbon between the rod and the tube.

6. In apparatus as claimed in claim 3, the combination with the parts and features therein specified of sealing means for the end of the cylinder opposite the tube.

RAYMOND R. RIDGWAY.